ABSTRACT OF THE DISCLOSURE

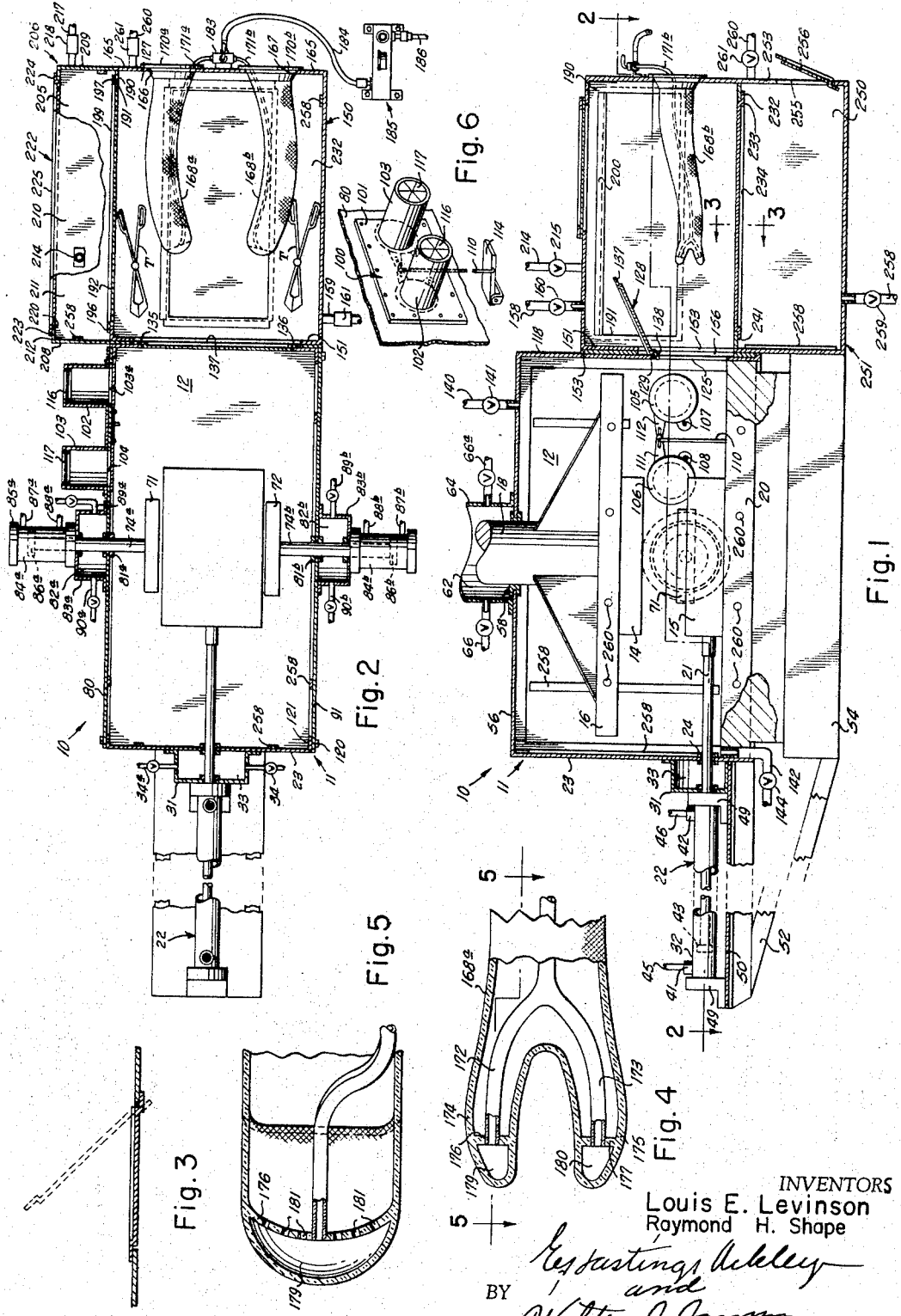
Nov. 7, 1967   L. E. LEVINSON ET AL   3,350,906
FORMING APPARATUS AND METHODS
Filed Oct. 26, 1964   2 Sheets-Sheet 1
INVENTORS
Louis E. Levinson
Raymond H. Shape
BY
ATTORNEYS

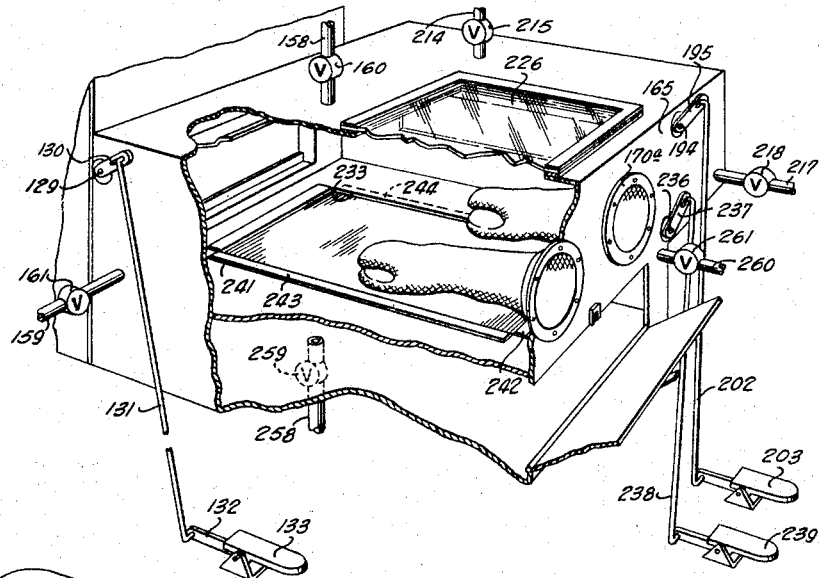
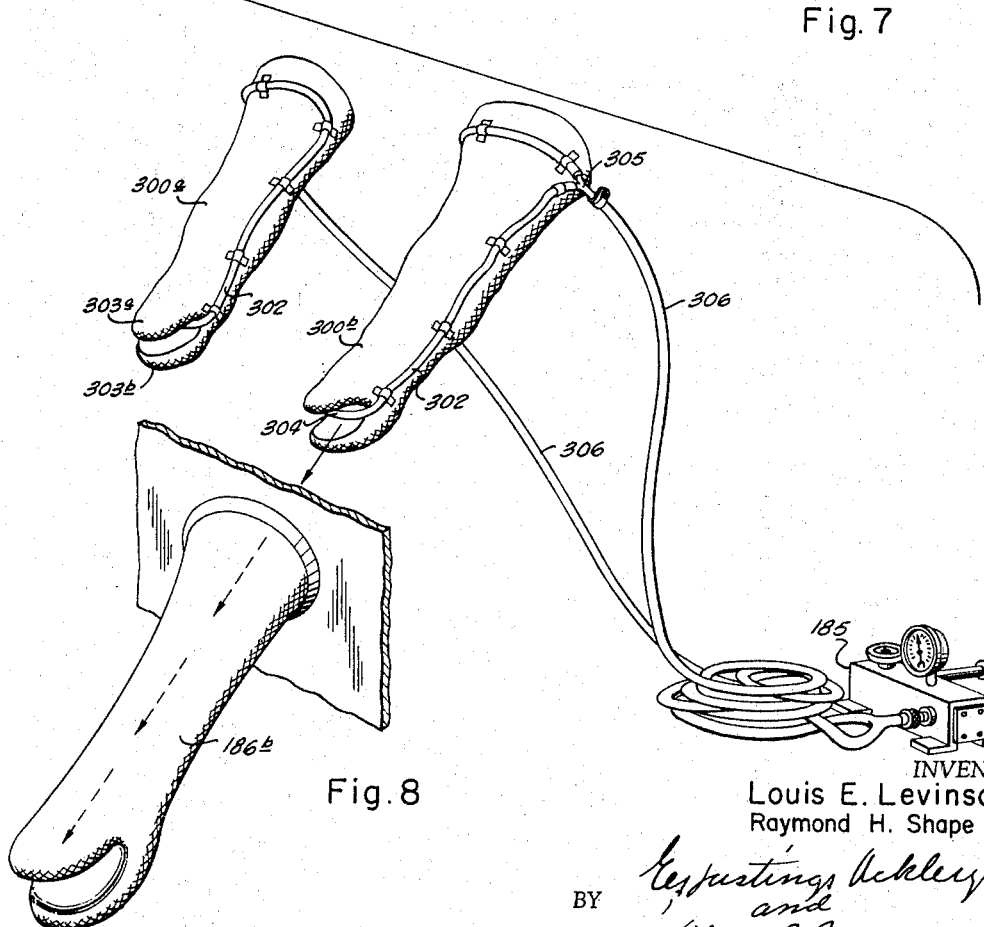
Fig. 7
Fig. 8
INVENTORS
Louis E. Levinson
Raymond H. Shape 3,350,906
FORMING APPARATUS AND METHODS
Louis E. Levinson, Dallas, and Raymond H. Shape, Garland, Tex., assignors to Intercontinental Manufacturing Company, Inc., Garland, Tex., a corporation of Texas
Filed Oct. 26, 1964, Ser. No. 406,513
11 Claims. (Cl. 72—37)

An apparatus for working and treating work pieces under predetermined conditions having a housing providing a work chamber in which the work pieces are formed by suitable forming means, such as dies, a storage chamber, a post forming or treatment chamber and a transfer chamber.

---

This invention relates to apparatus for working or treating work pieces in a controlled environment.

An object of the invention is to provide a new and improved apparatus for working and treating work pieces under predetermined or controlled temperature, pressure and atmosphere.

Another object is to provide a new and improved apparatus having a plurality of compartments each of which may be maintained under predetermined environmental conditions of temperature, pressure and atmosphere, the work piece being movable between the several compartments as required during the working or treatment of the work piece in order to minimize the loss of the atmospheres in the particular chambers and to minimize the variations in the pressure and temperature of the atmospheres in the several chambers.

Still another object is to provide an apparatus wherein the work piece may be maintained at a certain temperature and in a particular atmosphere or gas during its forming and may be allowed to cool at a predetermined rate in a particular gas, either the same gas as the one in which it was formed or in a different gas.

Still another object is to provide an apparatus having housing means providing a work chamber in which the work pieces may be formed or shaped by suitable forming means, such as dies, a storage chamber and a post forming treatment chamber and a loading and unloading or transfer chamber, the housing means having apertures communicating the transfer chamber with each of the other chambers closable by suitable doors or closures whereby the work pieces may be moved from the storage chamber to the transfer chamber for placement on the forming apparatus in the work chamber, removed from the forming apparatus to the transfer chamber and the formed work pieces moved from the transfer chamber into the treatment chamber, the closures being opened and closed during each such operation to cause the transfer chamber to be at any time in communication with only one of the other chambers.

Still another object is to provide an apparatus of the type described wherein one or more of the chambers of the apparatus may be maintained under predetermined environmental conditions, for example, the chamber may be filled with a particular desired inert gas such as argon or helium under a predetermined pressure and temperature.

A further object is to provide an apparatus of the type described wherein at least one of the chambers, such as the transfer chamber, is provided with a pair of flexible glove sleeves which extend thereto and by means of which articles may be handled by an operator at the exterior of the apparatus.

A still further object is to provide an apparatus, of the type described, wherein the gloves are provided with means for circulating the same gas as that present in the chamber into which the glove sleeves extend to cool the hands and arms of the operator whereby contamination is precluded of the gas in such chamber by gas leaking thereinto through the glove sleeves.

Still another object is to provide an apparatus of the type described having inner glove sleeves which are insertable into and removable from the glove sleeves which extend into such chamber and which are provided with conduit means for circulating a cooling gas between the two pairs of gloves.

Additional objects and advantages of the invention will be readily apparent from the reading of the following description of a device constructed in accordance with the invention, and reference to the accompanying drawings thereof, wherein:

FIGURE 1 is a schematic partly sectional illustration of an apparatus embodying the invention;

FIGURE 2 is a schematic partly sectional view taken on line 2—2 of FIGURE 1;

FIGURE 3 is a fragmentary sectional view taken on line 3—3 of FIGURE 1;

FIGURE 4 is an enlarged partly sectional fragmentary of one of the gloves of the apparatus illustrated in FIGURES 1 and 2;

FIGURE 5 is a fragmentary sectional view taken on line 5—5 of FIGURE 4;

FIGURE 6 is a fragmentary partly sectional view of the access port assembly of the work chamber housing;

FIGURE 7 is a schematic fragmentary view, with some parts broken away of a modified form of the apparatus illustrated embodying the invention; and, FIGURE 8 is a perspective view of inner cooling gloves which are insertable in the gloves of the loading and unloading housing.

Referring now to FIGURES 1 through 6 of the drawings, the apparatus 10 embodying the invention includes a work chamber housing 11 which provides a work chamber 12 in which the work pieces are formed by a suitable forming device such as the top and bottom dies 14 and 15. The top die is securable in the usual manner, as by bolts, to the ram plate 16 rigidly secured to a ram piston rod 18 of a hydraulic ram (not shown). The bottom die rests slidably upon a press bed 20 which forms the bottom of the work chamber 12.

The bottom die is secured to one end of the piston rod 21 of a hydraulic ram 22. The piston rod extends outwardly of the housing through a suitable aperture in the housing end wall 23 and a gasket or seal 24 seals between the piston rod and the end wall. The piston rod also extends through a seal housing 31 and into the ram cylinder 32. The chamber 33 of the seal housing may be filled with a suitable gas from any suitable source through a conduit 34.

The ram cylinder has fittings 41 and 42 adjacent its opposite ends through which fluid may be admitted into or exhausted from the cylinder at opposite sides of the piston 43 on the end of the piston rod through suitable conduits 45 and 46 which are connected to the inlet fittings 41 and 42, respectively. The cylinder is rigidly secured by means of its end brackets 49 and bolts or screws to a platform 50 which extends outwardly of the housing end wall 23. Suitable braces 52 extend between the outer end of the platform and the base 54 of the press bed to support the platform.

The ram piston rod 18 extends through an aperture in the top housing wall 56. A gasket or seal 58 seals between the wall and the piston rod. The piston rod extends upwardly through the chamber 62 of a seal housing 64 which may be filled with a suitable gas under predetermined pressure from a suitable source through an inlet conduit 66. The ram piston rod 18 extends, of course, into a cylinder of a hydraulic ram (not shown) and provided with a piston, the piston rod and piston being movable by fluid pressure introducible into and exhaustible from such cylinder in the same manner as the piston rod and piston of the hydraulic ram 22. A pair of lateral dies 71 and 72 are rigidly secured in any suitable manner to ram piston rods 74a and 74b, respectively, which are movable perpendicularly relative to the piston rod 21. The ram piston rod 74a extends horizontally outwardly through an aperture in the side housing wall 80 and a suitable gasket or seal 81a seals therebetween. This piston rod extends through a seal chamber 82a of a seal housing 83a into the cylinder 84a of the ram 85a. Hydraulic fluid is introducible into and exhausted from opposite sides of the piston 86a through suitable fittings 87a and 88a. A suitable gas under pressure is introducible into and exhaustible from the seal chamber through conduits 89a and 90a which may have valves connected therein. The piston rod 74b similarly extends through a suitable aperture in the opposite side wall 91 of the work chamber, a gasket 81b, and a seal chamber 82b provided by a seal housing 83b. Gas may be introduced or exhausted from the seal chamber through the conduits 89b and 90b which also have valves V connected therein. The piston rod extends through a cylinder 84b of the hydraulic ram 85b and fluid may be introduced into and exhausted from the cylinder on opposite sides of the piston 86b by means of the conduits 89b and 90b. The cylinders of the hydraulic rams 85a and 85b are rigidly secured to any suitable structure or platform (not shown) similar to the platform 50.

One of the side walls of the work chamber housing 11, for example the side wall 80 has an air lock assembly 100 connected thereto which includes a rectangular plate 101 having a pair of tubular members 102 and 103 rigidly secured thereto in alignment and communication with the ports 103a and 104 of the side wall.

The apertures 103a and 104 are closable by doors 105 and 106 pivotally mounted as at 107 and 108 on the side wall 80 and movable between open and closed positions by a link 110 which extends downwardly through a suitable aperture (properly sealed) of the work housing to the exterior thereof. The upper end portion or hook of the link extends through suitable aligned slots in the arms 111 and 112 of the doors and its lower end portion or hook extends through a suitable slot in a treadle 114 whereby when the treadle is depressed the doors pivot in opposite directions about their pivots 107 and 108.

The outer ends of the tubular members 102 and 103 are provided with slit diaphragms 116 and 117, respectively, of a resilient material, such as synthetic rubber or the like. The adjacent edges of the diaphragms defining the slits contact each other to provide a substantially air tight seal when in their undeformed positions illustrated in FIGURE 6 and being resiliently deformable radially outwardly to permit an operator to insert his hands and arms, which may be protected by suitable glove sleeves if the temperature within the work chamber is high, through the diaphragms, the tubular members and the apertures 103a and 104 into the work chamber.

One of the side walls of the work housing, for example, the side wall 91, may be removably secured to its end walls 23 and 118 as by means of screws 120 which, extend through suitable apertures in the side wall into a suitable internally extending flange 121 of the end walls 23 and 118 and the top wall 56 to permit installation, changing or adjustment of the dies.

The end wall 118 has an aperture 125 therein which opens to the loading and unloading or transfer chamber 127. The aperture 125 is closable by a door 128 whose upper end is rigidly secured to the shaft 129 rotatably supported at its opposite ends in suitable bearings secured to the housing. One end of the shaft may extend through a suitable gasket or seal outwardly of the work housing and has a lever arm 130 rigid therewith by means of which the door 128 may be moved between its upper open and lower closed positions. A link 131 has opposite ends pivotally secured to the pivot arm and to the arm 132 of a treadle 133 to permit operation of the door 128 by the foot of the operator. The door is provided with side flanges 135 and 136, and a bottom flange 137 which abut adjacent outer surfaces of the side wall 118 and with a top flange 138 which abuts the internal surfaces of the end wall when the door is in its closed position.

It will be apparent that the provision of these flanges causes the door to effectively prevent any flow of gas between the work and transfer chambers when in its closed position especially if the pressures of the gases in the two chambers are substantially equal.

The work housing has a conduit 140 which opens into the work chamber preferably at the highest point through which a gas may be introduced or exhausted from the chamber. The conduit 140 has a valve 141 connected therein. A similar conduit 142 opens into the work chamber preferably at its lowest point and is provided with a valve 144.

It will be apparent that if it is desired to exhaust gas from the work chamber, one of the conduits 140 or 142 is closed by means of its valve, for example, the valve 144 of the bottom conduit 142, and the conduit 140 is connected to a suitable suction or vacuum creating means, such as a pump, and its valve 141 is opened. If it is then desired to fill the chamber with a particular gas, the conduit 142 is connected to a suitable source of the gas, such as a bottle or tank of the desired gas and the valve 144 is opened to permit flow of such gas into the chamber. During this operation, the valve 141 may be open and the conduit 140 connected to the pump which may assist in drawing such gas into the chamber or, alternatively, the conduit 140 may be open to the atmosphere. If the gas to be introduced into the work chamber is heavier than air, such as argon, it is of course introduced into the chamber through the bottom conduit 142 while the air is exhausted from the top of the chamber through the conduit 140. If the gas is lighter than air, for example, helium, such gas is introduced into the top of the chamber through the upper conduit 140 while the air is exhausted therefrom through the lower conduit 142. After the work chamber is filled with the desired gas or atmosphere, the valve of the conduit through which air was exhausted from the work chamber is closed and the valve of the conduit through which the gas was introduced into the chamber is left open to maintain the gas in the chamber at a predetermined pressure, for example, slightly higher than ambient atmospheric pressure to prevent air from leaking into the work chamber.

The transfer chamber 127 is provided by a transfer housing 150 whose end wall 151 is spaced from the end wall 118 by suitable spacer plate 153. The end wall 151 and the spacer plate 153 have apertures or openings 155 and 156, respectively, through which the door 128 may move between its open and closed positions. Gas is introducible into and exhaustible from the transfer chamber through the conduits 158 and 159 when their valves 160 and 161 are open. The upper conduit 158 preferably opens into the transfer chamber at its highest point and the lower conduit 159 preferably opens into the transfer chamber at its lowest point.

The other end wall 165 of transfer housing has a pair of circular apertures 166 and 167 through which extend into the transfer chamber a pair of gloove sleeves 168a and 168b, respectively. The gloves may be bonded or otherwise suitably secured to rigid annular rings 170a and 170b which are secured to the exterior of the side wall in any suitable manner and with a suitable sealing compound or gasket interposed therebetween. The glove sleeves are preferably formed of a flexible heat resistance material, such as asbestos or the like. A cooled gas may be circulated through the sleeves by means of the flexible ducts 171a and 171b which extend into the gloves 168a and 168b. Each duct has end branch portions 172 and 173 which extend into the bifurcated inner end portions 174 and 175, respectively, of the glove sleeves. The duct branches 172 and 173 extend through and are secured to the end partitions 176 and 177 at the innermost ends of the bifurcated portions whereby gas flowing under pressure through the ducts 171a and 171b flows through the branch ducts into the end passages 179 and 180 of the extreme inner ends of the gloves and then rearwardly through the apertures 181 in such partitions to the interior of the glove sleeves and then outwardly through the glove sleeves. The conduits 171a and 171b are connected to a suitable valve 183 to which a gas cooled to a predetermined temperature is conducted through a conduit 184 from a suitable cooling apparatus 185 to which such gas may be applied from a suitable source of the gas under pressure through an inlet conduit 186. The cooling device 185 which is shown schematically in the drawings, may have suitable means for cooling the gas, as it flows through a heat exchanger which for example may be immersed in a cold liquid. The gas may also be cooled by means of a usual mechanical refrigeration apparatus in which event the cooling device 185 will have the evaporator unit of such refrigeration apparatus therein to absorb the heat from the gas flowing to the gloves.

The side wall 190 of the transfer housing has an opening or aperture 191 therein which is closable by a door 192 whose upper end is rigidly secured to a suitable shaft 194 journaled at its opposite ends to the transfer housing and one end portion of which may extend outwardly through the end wall 165 properly sealed and may be provided with a lever arm 195 by means of which the door may be pivoted upwardly from the closed position illustrated in FIGURES 1 and 2 to its upper open position shown in FIGURE 7. The door 192 may have outwardly displaced side flanges 196 and 197 and a bottom flange 199 which abuts the outer surface of the side wall 190 and an inwardly displaced top flange 200 which abuts the internal surface of the end wall. The link 195 is movable by a link 202 and treadle 203, the link being pivotally connected at its opposite ends to the lever arm and the treadle.

When the door 192 is in its open position, the transfer chamber is in communication with a storage chamber 205 provided by a storage housing 206. The storage housing has end walls 208 and 209, a top wall 210, a bottom wall 211 and an outer side wall 212. The storage housing is connected to the transfer housing in any suitable manner. Gas is introducible and removable from the storage chamber through a conduit 214 which preferably opens to the storage chamber at its highest point and is provided with a valve 215 therein and also through a lower conduit 217 which opens to the storage chamber, preferably at its lowest point, and is similarly provided with a valve 218.

The side wall 212 has a large aperture or opening 220 which is closable by a door 222 hingedly or otherwise connected to the side wall and may be of the same type of door as the door 199 having flanges 223 and 224 at its sides, and a bottom flange 225 to abut external surfaces of the side wall and a top inner flange 226 to abut the internal surface of the side wall for providing a substantially air tight seal between the door and the side wall when the door is in its closed position.

The bottom wall 232 of the transfer housing has an aperture 233 closable by a door 234 which has a shaft 236 rigidly secured to one edge thereof. The shaft is suitably journaled in the housing and has one end portion which extends outwardly of the end wall 165 suitably sealed and has a lever arm 237 rigidly secured thereto. The door 234 is pivotable upwardly to its upper open position by a link 238 whose opposite ends are pivotally secured to the lever arm and to a treadle 239.

The door 234 has side flanges 241 and 242 and an end flange 243 which are adapted to abut the top surface of the bottom wall 232 and an end flange 244 which is adapted to abut the bottom surface of the bottom wall.

The aperture 233 permits communication between the transfer chamber and a cooling chamber 250 provided by a cooling housing 251, one of whose end walls 253 has an aperture 255 which is closable by a door 256 hingedly secured to the end wall. Gas is introducible into and exhaustible from the cooling chamber preferably at its lowest point, through a conduit 258 having a valve 259 connected therein. Gas is also introducible into and exhaustible from the cooling chamber, preferably at its highest point, through a conduit 260 having a valve 261 connected therein.

The storage chamber 205, the work chamber 12 and the transfer chamber 127, if desired, may be provided with suitable heating means 258 such as electric heating elements or the like to raise and maintain the temperature of the gas within the chambers at a predetermined value. In addition, the ram plate 16 and the press bed 20 are provided with such electric heating elements 260 which are inserted into suitable bores therein. Electric current is supplied to these heating elements through suitable cables (not shown) which extend into the chamber through properly sealed apertures in the housing. The cable to the movable ram plate 16 is of course flexible to permit movement of the ram plate.

While the various walls of the housing have been shown schematically as single members, they may be of any suitable heat insulating construction, e.g., with an insulation such as rock wall between inner and outer rigid plates, or with a layer of asbestos or the like applied to the exterior thereof.

In use, if it is desired to form and treat work pieces made of a substance which can be worked only at high temperatures, for example 1200 to 1500 degrees Fahrenheit, and in a particular atmosphere which does not permit oxidization of the work pieces which occur at a temperature above a critical or oxidizing temperature, for example 850 degrees Fahrenheit, each of the work pieces may be preheated to a temperature below the oxidizing temperature and placed into the storage chamber 205 whereupon its door 222 is closed.

If a gas heavier than air, such as argon, is to be used to displace the air in the chambers, the work chamber 12, the transfer chamber 127, the storage chamber 205, and the cooling chamber may first be partially evacuated by pumping air therefrom through the conduits 140, 158, 214 and 260, respectively, while their lower conduits are closed.

Prior to such evacuation of these chambers, the seal chambers 33, 62, 82a and 82b are filled with the gas argon by connecting one of their conduits to a source of such gas under pressure such as the conduits 34, 66, 90a and 90b while opening the valve of their other conduits such as the conduits 34a, 66a, 89a and 89b. When all of the air has been urged these seal chambers and the valves of the conduits through which the air was being bled to the atmosphere are closed and the argon gas within the seal chambers is then held under a predetermined pressure slightly higher than the ambient pressure by leaving open the valves in the conduits by which they are connected to the source of gas under pressure.

If the temperature in the work chamber is to be very high, cooled argon gas is continuously circulated through the seal chambers to prevent the temperature of the hydraulic rams from being raised to excessive values which might cause them to malfunction.

The air in the chamber 12, the transfer chamber 127, the storage chamber 205 and the cooling chamber 250 is then replaced by argon gas by opening the valves in their lower conduits 142, 159, 217 and 260, which are connected to a source of argon under pressure to permit flow of argon into the lower ends of these chambers. When sufficient argon gas has circulated through these chambers to replace all the air to the desired degree, which may be detected, if desired, by any suitable detector means located in each of the chambers, the valves of the upper conduits are closed and the argon gas in each of the chambers is then held under predetermined pressure which may be slightly higher than ambient pressure since the valves in their lower conduits are left open. If desired, pressure regulator valves may be connected in the lower conduits to maintain such pressure.

The temperatures in the various chambers are maintained at desired values by the operation of the heating elements 258 and 260. In addition, the gas circulated into the chambers may be heated before it is introduced into the chambers. Alternatively, if it is desired that the temperature be lowered, as in the cooling chamber, the gas being circulated thereto may be cooled by suitable means prior to its introduction into such chamber.

When the temperature of the work pieces in the storage chamber has risen to the desired value, which may still be below the actual temperature at which the work pieces are to be formed in the work chamber by the dies, the operator opens the valve 183 to permit cooled argon gas to flow therethrough in the manner desired and then inserts his hands and arms into the sleeves, grasps the tongs T, opens the door 192 and removes one of the work pieces from the storage chamber and places it in the transfer chamber. The door 192 is then closed, the door 128 is open, the bottom die 15 is moved by the operation of its ram toward the aperture 125, and may actually move partly within the storage tank, and the work piece is placed on the bottom die which is then drawn back into its operative position below the top die. The door 128 is then closed. When the work piece itself is heated by its contact with the bottom die, and also with the top die if it is partially lowered into contact with the work piece, to the desired temperature, the top ram piston rod 118 is moved to its lowermost position to form the work piece between the bottom and top dies. If subsequent operations are then required to be performed on the work piece by the dies 71 and 72, they are moved inwardly as required by their rams 85a and 85b. During this operation of the dies, the operator may remove one of the work pieces from the storage chamber and place it in the transfer chamber.

After the first work piece has been formed, the door 128 is opened, the lower die 115 is slid by means of its hydraulic ram to the aperture 125 and partially into the transfer chamber. The operator then takes off the formed first work piece deposits it on the bottom of the transfer chamber. He then picks up the second work piece which he has previously placed in the transfer chamber, and places it on the bottom die which is then drawn back again to its operative position below the top die. The operator then closes the door 128 and opens the door 234 and deposits the formed work piece in the cooling chamber 250 through which the cooled argon gas is being circulated at such temperature and rate as to cool the work pieces at a desired rate to a desired temperature below the oxidization temperature of the metal of which the work piece is made. This sequence of operations is repeated until each of the work pieces, which have been previously stored in the storage chamber, has been formed and placed in the cooling chamber. At this time, the door 222 may be opened to place more work pieces in the storage chamber and while the door 192 is held closed and while the transfer chamber 127 is still held at a pressure slightly above ambient pressure so that no air which flows into the storage chamber will flow into the transfer chamber. The air in the storage chamber is then again exhausted and replaced by the argon gas whereupon this procedure may again take place. Similarly, when the work pieces in the cooling chamber have cooled to a desired temperature, the door 256 may be opened and the work pieces removed therefrom, after which the door 256 is again closed, the chamber 250 is again exhausted of air which is again replaced by the argon gas.

It will now be seen that a new and improved apparatus has been illustrated and described by means of which work pieces may be easily handled and worked while the environment in which they are formed and treated is controlled as to temperature, pressure and atmosphere.

It will further be seen that while each of the chambers has been described as being filled with the same gas, such as argon, that one or more of the chambers may have a different atmosphere or gas therein than the others. For example, the atmosphere of the cooling chamber may be of another gas, if desired, since the characteristics of particular metals may be different if the metals are cooled in different gases. For example, titanium becomes very hard and brittle if it is cooled in an atmosphere of oxygen.

It will further be seen that while the gas in each of the chambers has been described as being slightly above atmospheric pressure, the chambers may be maintained under less than atmospheric pressure. This may be especially desirable to present loss of heat from the dies, if the dies themselves are provided with the heating elements, by conduction through a relatively heavy atmosphere. In this case, the gas in the seal chambers will also be held below atmospheric pressure.

It will further be seen that if desired, the step of partial evacuation of the chambers may be omitted and the air purged from the various chambers merely by circulation of the desired gas through the chambers until the air is replaced to the required degree.

Refering now particularly to FIGURE 8 of the drawings, if the temperature within the transfer chamber is very high, the flow of cooling gas through the ducts 171a and 171b may not be effective to maintain the temperature within the glove sleeves low enough to permit the operator to insert his hands into the glove sleeves 168a and 168b. In this case, the glove sleeves 168a and 168b are not provided with the conduits 171a and 171b and the operator places a pair of inner glove sleeves 300a and 300b of a flexible heat insulating substance, such as asbestos, on his hands and arms prior to inserting them into the glove sleeves 168a and 168b. The inner gloves each have a flexible conduit 302 which extends externally the length of the glove sleeve and between the bifurcated end portions 303a and 303b of the glove sleeve. The intermediate portion 304 of the conduit between the end portions is provided with a plurality of small apertures through which the cooling gas may flow outwardly from the conduit. The opposite ends of the conduits are connected by T-fittings 305 to flexible conduits 306 through which the cooled gas from the cooling apparatus 185 flows to the fittings.

It will now be seen that the atmosphere in each of the chambers is protected against contamination since the seal chambers and the glove sleeves which extend into the transfer chamber have the same gas therein as being circulated therethrough as that in the work chamber and the transfer chamber so that if any gas tends to leak into the work chamber from the seal chambers past the piston rods or if any gas tends to leak through the gloves into the transfer chamber, such gas does not contaminate the atmosphere in the chamber.

It will further be seen that any leaking of gas into the chambers from the exterior of the apparatus is of course precluded if the pressures of the gas in the chambers are above ambient atmospheric pressure.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. An apparatus including: housing means providing a work chamber, a transfer chamber, a storage chamber and a treatment chamber, said housing means having apertures communicating said transfer chamber with each of said work chamber, storage chamber and treatment chamber; means for individually closing said apertures, said housing means having access apertures providing access to said storage and treatment chambers; means for closing said access apertures; and means in said work chamber operable from exteriorly of said housing means for changing the form of work pieces.

2. The apparatus of claim 1, and means for introducing gas into and exhausting gas from each of said chambers.

3. The apparatus of claim 2, and means for heating each of said chambers.

4. An apparatus including: housing means providing a work chamber, a transfer chamber, a storage chamber and a treatment chamber, said housing means having apertures communicating said transfer chamber with each of said work chamber, storage chamber and treatment chamber; means for individually closing said apertures, said housing means having access apertures providing access to said storage and treatment chambers; means for closing said access apertures; means in said work chamber operable from exteriorly of said housing means for changing the form of work pieces; and flexible tubular means extending into said transfer chamber whereby work pieces can be moved between said chambers by an operator positioned exteriorly of said apparatus.

5. An apparatus including: housing means providing a work chamber, a transfer chamber, a storage chamber and a treatment chamber; said treatment chamber being disposed below said transfer chamber, said housing means having apertures communicating said transfer chamber individually with each of the other of said chambers; closure means for individually closing said apertures; working means disposed in said work chamber and operable from exteriorly of said housing means; first flexible tubular means extending into said transfer chamber, said flexible tubular means being closed at their inner ends and open at their outer ends; inner flexible tubular means insertable in said first flexible tubular means; and means for circulating a gas between said inner and first tubular means.

6. An apparatus including: housing means providing a work chamber, a transfer chamber, a storage chamber, and a treatment chamber, said housing means having apertures communicating said transfer chamber with each of said work chamber, storage chamber and treatment chamber, said treatment chamber being disposed below said transfer chamber; means for individually closing said apertures, said housing means having access apertures providing access to said storage and treatment chambers; means for selectively closing said access apertures; means in said work chamber for working work pieces, said working means including movable means extending into said work chamber from the exterior of said housing means; seal chamber means providing seal chambers, said movable means extending through said seal chamber means; and means for introducing and exhausting gas from said seal chambers and said chambers of said housing means.

7. An apparatus including: housing means providing a work chamber, a transfer chamber, a storage chamber, and a treatment chamber, said housing means having apertures communicating said transfer chamber with each of said work chamber, storage chamber and treatment chamber, said treatment chamber being disposed below said transfer chamber; means for individually closing said apertures, said housing means having access apertures providing access to said storage and treatment chambers; and means for controlling the temperature in each of said chambers.

8. In an apparatus having a housing providing a chamber and having at least one aperture communicating said chamber with the exterior of said housing: a first flexible tubular means closing said aperture and extending into the chamber, said first flexible tubular means being closed at its inner end and open at its outer end, and an inner flexible tubular means insertable in said first flexible tubular means, said inner flexible tubular means being closed at its inner end and open at its outer end; and conduit means secured to said inner tubular means extending substantially the length thereof for conducting a gas to the inner end thereof exteriorly of said inner flexible tubular means, whereby a gas may be circulated between said inner and first tubular means when the inner means are inserted in said first tubular means.

9. An apparatus including: housing means providing a work chamber, a transfer chamber, a storage chamber, and a treatment chamber, said treatment chamber being disposed below said transfer chamber, said housing means having apertures communicating said transfer chamber individually with each of the other of said chambers; closure means for individually closing said apertures, said housing means having a pair of apertures opening from the exterior of said housing means to said transfer chamber; and glove sleeves secured to said housing means and closing said opening, said glove sleeves extending into said transfer chamber and being closed at their inner ends and open at their outer ends whereby the arms and hands of an operator may be inserted thereinto to move work pieces between said transfer chamber and each of the others of said chambers.

10. An apparatus including: housing means providing a work chamber, a transfer chamber, a storage chamber, and a treatment chamber, said treatment chamber being disposed below said transfer chamber, said housing means having apertures communicating said transfer chamber individually with each of the other of said chambers; closure means for individually closing said apertures, said housing means having a pair of apertures opening from the exterior of said housing means to said transfer chamber; glove sleeves secured to said housing means and closing said opening, said glove sleeves extending into said transfer chamber and being closed at their inner ends and open at their outer ends whereby the arms and hands of an operator may be inserted thereinto to move work pieces between said transfer chamber and each of the others of said chambers; and conduit means extending into said glove sleeves for introducing gas to their inner ends for outward flow therefrom.

11. An apparatus including: housing means providing a work chamber, a transfer chamber, a storage chamber, and a treatment chamber, said treatment chamber being disposed below said transfer chamber, said housing means having apertures communicating said transfer chamber individually with each of the other of said chambers; closure means for individually closing said apertures, said housing means having a pair of apertures opening from the exterior of said housing means to said transfer chamber; glove sleeves secured to said housing means and closing said opening, said glove sleeves extending into said transfer chamber and being closed at their inner ends and open at their outer ends whereby the arms and hands of an operator may be inserted thereinto to move work pieces between said transfer chamber and each of the others of said chambers; a pair of inner glove sleeves insertable in said first mentioned glove sleeves; and conduit means connected to said inner glove sleeves for introducing gas exteriorly of said glove sleeves and into said first mentioned glove sleeves at the inner ends of said inner glove sleeves when said inner glove sleeves are inserted in said first mentioned glove sleeves.

References Cited

UNITED STATES PATENTS

| | | | |
|---|---|---|---|
| 693,469 | 2/1902 | Wagner et al. | 312—31.3 |
| 1,103,435 | 7/1941 | Rodgers | 34—214 |
| 2,944,500 | 7/1960 | Raynes | 72—37 |

FOREIGN PATENTS

| | | |
|---|---|---|
| 77,717 | 3/1962 | France. |

WILLIAM W. DYER, JR., *Primary Examiner.*

UNITED STATES PATENT OFFICE
CERTIFICATE OF CORRECTION

Patent No. 3,350,906

November 7, 1967

Louis E. Levinson et al.

It is hereby certified that error appears in the above numbered patent requiring correction and that the said Letters Patent should read as corrected below.

Column 5, line 10, for "gloove" read -- glove --; column 6, line 75, for "urged" read -- purged --; column 8, line 38, for "present" read -- prevent --; line 48, for "Refering" read -- Referring --.

Signed and sealed this 17th day of December 1968.

(SEAL)
Attest:

Edward M. Fletcher, Jr.
Attesting Officer

EDWARD J. BRENNER
Commissioner of Patents